2,883,420

PROCESS OF PREPARING 2-OXOADIPIC ACID

Milon Walker Bullock, Pearl River, N.Y., and John James Hand, New Milford, N.J., assignors to American Cyanamid Company, New York, N.Y., a corporation of Maine No Drawing. Application August 19, 1957
Serial No. 679,061

11 Claims. (Cl. 260—483)

This invention relates to a new process for the preparation of 2-oxoadipic acid and its esters. The new invention also includes new ozonides which are used as intermediates in the process and the process of preparing them.

Recently it has been discovered by Broquist, Brockman, and Stiffey, copending application Serial No. 679,060, filed August 19, 1957, for an improvement in Production of Lysine I, that 2-oxoadipic acid can be converted by the enzymes of yeast to 1-lysine, one of the essential amino acids. Lysine is deficient in many cereal grains and is being added to food products made from these grains to bring their amino acid content into a more effective nutritional balance. Lysine is, however, a very expensive material even though it may be made by synthetic chemical methods and by fermentation processes.

2-oxoadipic acid, also known as alpha-ketoadipic acid, is an old compound. A process of preparing this acid was described by Gault, Comptes rend., 148, 1114 (1909). This process involved the steps of reacting ethyl adipate with ethyl oxalate in a solution of diethyl ether with potassium ethylate as catalyst whereby ethyl oxalglutarate was formed. Hydrolysis of this ester with hydrochloric acid resulted in the formation of 2-oxoadipic acid. This process is very expensive and dangerous to operate because it is necessary to prepare potassium ethylate from potassium metal; and diethyl ether is a very hazardous solvent, particularly for reactions which are conducted on a large scale. These difficulties coupled with the low yields by this process made 2-oxoadipic acid a very expensive substance. In order that the process of Broquist et al. be economically effective, it is necessary to provide a cheaper supply of 2-oxoadipic acid.

The present invention provides a much cheaper and safer and more convenient method of preparing 2-oxoadipic acid. The starting material of the process of the present invention is a 2-carbalkoxycyclopentanone, preferably 2-carbethoxycyclopentanone, an old compound, the preparation of which is described in Organic Synthesis, volume 2, pages 116–119, 1943. The first step of our new process involves the ozonization of this pentanone to a product which may then be reductively decomposed to yield the half ethyl ester of 2-oxoadipic acid, also named 5-carbethoxy-5-oxovaleric acid.

The ozonization of the 2-carbalkoxycyclopentanone is readily effected by contacting the pentanone with ozone. It is usually more convenient to dissolve or suspend the pentanone in an organic liquid not readily attacked by the ozone. Water, unsaturated hydrocarbons, sulfides and mercaptans are considered undesirable solvents. The lower alcohols, though attacked by ozone to some extent, may be used because their rate of decomposition is not rapid and the ozonization may be completed before the solvent is seriously decomposed.

A preferred embodiment of the invention involves the use of an alkaline catalyst such as an alkali metal hydroxide or an alkali metal alkoxide in a neutral solvent such as acetonitrile. Powdered glass, because of the alkaline character of its surface, tends to promote rapid ozonization in neutral solvents. Other alkaline substances which are not rapidly decomposed by ozone may also be used as the catalyst. The ozonization proceeds at a sufficiently rapid rate without catalyst in high polar solvents such as acetic acid and formic acid.

The reaction is carried out by simply passing a stream of ozone through the solution, or suspension, of the 2-carbalkoxycyclopentanone until the reaction is complete as is evidenced by absorption of an equimolar amount of ozone or by the blue color of the solution resulting from an excess of ozone. A variety of ozone generators are available and any suitable source of ozone is satisfactory.

An advantage of the invention is that the ozonized 2-carbalkoxycyclopentanone need not be recovered from the reaction mixture. It is readily reduced to the 5-carbalkoxy-5-oxovaleric acid, even by simple heating with water. Although this is a cheap means of reducing the product, it is not generally desirable because there is a tendency for hydrogen peroxide to form which oxidizes some of the desired product to glutaric acid resulting in a lower yield. Formation of the by-product glutaric acid can be minimized if the ozonized pentanone is decomposed in the presence of an excess of an easily oxidizable material such as formaldehyde.

Almost any reducing agent will decompose the ozonized pentanone to the desired product; but in a preferred embodiment, hydrogen with palladium on charcoal as the reduction catalyst is used. The temperature and pressure at which the reduction is carried out is not critical; but for convenience, it is preferred to carry out the reduction at room temperature and at approximately 1 atmosphere absolute pressure.

The product of the reductive decomposition, 5-carbalkoxy-5-oxovaleric acid ester may be recovered by simply filtering off the catalyst and evaporating the solvent. Saponification with dilute alkali or hydrolysis with acids yields 2-oxoadipic acid, as will be shown in the specific examples which follow.

Example 1

A solution of 31.2 grams (0.2 mole) of 2-carbethoxycyclopentanone in 200 milliliters glacial acetic acid was placed in a 500 milliliter gas washing bottle and ozonized at 20–25° by passing a stream of ozone-oxygen mixture through the solution for two hours. The amount of ozone generated was about 2.5 milli-equivalents per minute. At the end of the ozonolysis, the acetic acid solution became blue from excess ozone present. The blue color was discharged by passing a stream of dry nitrogen through the solution for ten minutes. The acetic acid solution of the ozonide was poured into 200 milliliters of water and the resulting solution heated on the steam bath for thirty minutes. At this time a starch-iodide test for oxidizing agents was found to be negative. The solvents were distilled off, leaving 31 grams of oil. The oil was dissolved in 100 milliliters of hot benzene. On cooling, a crystalline product separated. The crystals were recovered and found to be glutaric acid. The benzene solution from which the glutaric acid was recovered was evaporated, and the oily residue, weighing 21 grams, was purified by distillation. The fraction distilling 138–140° at 0.3 millimeter was collected as product. The yield of 5-carbethoxy-5-oxovaleric acid obtained from the distillation was 9.2 grams or 22.2 percent. This crystallized to a low-melting solid. The 5-carbethoxy-5-oxovaleric acid was hydrolyzed by storing overnight with 40 milliliters water and 2 milliliters concentrated hydrochloric acid. The mixture was heated on the steam bath for twenty minutes and the solvents distilled off under the reduced pressure of a water aspirator. This gave 5.9 grams, 14 percent overall yield, of white crystalline 2-oxoadipic acid. After washing with a little nitromethane followed by cyclohexane, it melted at 125–126°. A mixed melting point with an authentic sample of 2-oxoadipic acid was 125–126°.

*Example II*

A solution of about 10.3 grams (0.066 mole) of 2-carbethoxy-cyclopentanone and about 20 milligrams sodium methoxide in 260 milliliters acetonitrile was ozonized by passing an ozone-oxygen stream through the solution until the rapid absorption of ozone stopped. The measured ozone uptake was 0.066 mole. The excess ozone was swept out of the reaction mixture with a stream of nitrogen and the reaction mixture transferred to a low pressure hydrogenation apparatus. Now 0.4 gram of 10 percent palladium on charcoal catalyst was added and the ozonide reduced. The hydrogen uptake was very rapid. The catalyst was filtered off and the solvent evaporated, leaving 10.4 grams of crude 5-carbethoxy-5-oxovaleric acid. The crude product was distilled yielding 3.5 grams of an unidentified product, distilling 72–80° at 0.03 millimeter and 5.6 grams, 45.2 percent, of 5-carbethoxy-5-oxovaleric acid distilling 127–129° at 0.03 millimeter and crystallizing in the receiver. Acid hydrolysis of this product yielded 2-oxoadipic acid.

*Example III*

A solution of 15.62 grams (0.1 mole) of 2-carbethoxy-cyclopentanone in 400 milliliters of formic acid was ozonized by passing through the reaction mixture a stream of ozone-oxygen mixture until a calculated 0.094 mole of ozone had been absorbed. The ozonization was started at 0° but warmed to about 40° after about 12 millimoles of ozone had been absorbed. Excess ozone was removed with a stream of nitrogen and 0.5 gram of 10 percent palladium on charcoal catalyst was added. Now hydrogen was slowly bubbled through the solution for four hours. The catalyst was filtered off and the formic acid evaporated under the reduced pressure of a water aspirator. The residue was mixed with 50 milliliters of benzene thus precipitating 4.7 grams of glutaric acid, melting point 96.5–97.5°. Evaporation of the benzene left 11.1 grams of crude oily 5-carbethoxy-5-oxovaleric acid which was purified by distillation. The fraction distilling 132–137° at 0.03 millimeter and crystallizing in the receiver was taken as product. The yield of purified 5-carbethoxy-5-oxovaleric acid was 4.03 grams, 21.4 percent. The ester was hydrolyzed with dilute hydrochloric acid, yielding 3.6 grams of crystalline 2-oxoadipic acid.

*Example IV*

A solution of 15.62 grams (0.10 mole) of 2-carbethoxycyclopentanone and 20 milligrams of sodium methoxide in 400 milliliters of acetonitrile was made up in a 500-milliliter gas washing bottle and an ozone-oxygen mixture was passed through the solution. The ozone absorption was rapid and 89.3 millimoles was taken up before 1.4 millimoles had leaked through the solution. An additional 6.6 millimoles of ozone was passed into the solution and 3.8 millimoles of the ozone was absorbed. The reaction mixture was swept out with nitrogen and passed into 100 milliliters of water containing 16.2 grams (0.2 mole) of 37 percent aqueous formaldehyde. The resulting solution was heated on the steam bath a few minutes until a starch-iodide test for peroxides was negative. The solvents were distilled off and the residue taken up in 100 milliliters of benzene. No glutaric acid was obtained by this treatment. The benzene was distilled off leaving 18.8 grams of oil. The product was distilled and the fraction distilling 125–130° at 0.01 millimeter and crystallizing in the receiver collected as product. The yield of crystalline 5-carbethoxy-5-oxovaleric acid was 8.39 grams or 44.6 percent.

The ester was hydrolyzed with dilute hydrochloric acid to yield after evaporation of the solvent 8.0 grams of crude crystalline 2-oxoadipic acid. Recrystallization of the crude product from nitromethane yielded 5.76 grams of pure 2-oxoadipic acid, melting point 125–126°.

*Example V*

A 500-milliliter gas washing bottle was charged with 31.2 grams (0.2 mole) of 2-carbethoxycyclopentanone and 200 milliliters formic acid. About 275 millimoles of ozone was passed into the solution over a period of 2.5 hours. The solution of the ozonide was divided into two equal portions. One half was poured into a solution of 9 milliliters (0.11 mole) of 37 percent formaldehyde in 100 milliliters of water. The solution was heated fifteen minutes and the solvents evaporated at the water pump. Benzene was added to the residue which caused a small amount of insoluble oil to separate. The benzene was evaporated and the oily residue distilled. The fraction distilling 124–130° was collected as product. The yield of 5-carbethoxy-5-oxovaleric acid from this aliquot was 5.9 grams or 37.5 percent.

The second half of ozonide solution was poured into 100 milliliters of water. The resulting solution was heated on the steam bath fifteen minutes, and the solvents evaporated. The residue was treated with benzene and the benzene-insoluble glutaric acid recovered. The amount of glutaric acid recovered was 7.5 grams. The benzene was distilled from the benzene-soluble fraction. The resulting oil was distilled and the fraction distilling 128–131° at 0.01 millimeter and crystallizing in the receiver was collected as product. The yield of crystalline 5-carbethoxy-5-oxovaleric acid was 2.75 grams or 17.6 percent.

The esters from both aliquots were hydrolyzed to 2-oxoadipic acid as described in previous examples.

*Example VI*

A 500-milliliter gas washing bottle was charged with 21.3 grams (0.15 mole) of 2-carbomethoxycyclopentanone, 0.2 gram sodium methoxide and 400 milliliters nitromethane. A stream of ozone-oxygen mixture was passed into the reaction mixture at 0–5° C., until a calculated 0.155 mole had been added and the mixture became a pale blue from excess ozone. The excess ozone was flushed out with nitrogen and the reaction mixture poured into a flask containing 0.3 mole of aqueous 37 percent formaldehyde. The resulting solution was warmed on the steam bath to 60° C. A starch-iodide test was taken and found to be negative. The solvents were distilled off under the reduced pressure of a water pump and the residue, weighting 24.9 grams, was taken up in 100 milliliters of benzene. Crystals formed when the resulting solution was cooled in an ice bath. The crystals were filtered off. This gave 8.88 grams of crude 5-carbomethoxy-5-oxovaleric acid, melting point 46–49° C. By concentration of the mother liquor, an additional 8.45 grams of product was obtained in two crops, bringing the total yield to 17.33 grams (0.0995 mole), 66.5 percent. After recrystallization from a benzene-ligroin mixture, the product had a melting point of 54–58° C., and after an additional recrystallization from an ether-ligroin mixture the melting point was 57–58.5° C.

*Example VII*

A 500-milliliter gas washing bottle was charged with 21.3 grams (0.15 mole) of 2-carbomethoxycyclopentanone, 0.2 gram sodium methoxide and 400 milliliters acetonitrile. An ozone stream was passed into the mixture at 0–5° until 0.147 mole has been absorbed. The excess ozone was flushed out with nitrogen and the ozonide solution poured into a flask containing 0.3 mole of 37 percent aqueous formaldehyde and warmed on the steam bath a few minutes to decompose the ozonide and the liberated hydrogen peroxide. The solvents were removed by distillation, leaving an oil which was purified by distillation. The fraction distilling 110–140° at 0.005 millimeter and weighing 9.14 grams (0.0524 mole), 35 percent, was collected as product. The product crystallized on seeding the distillate.

*Example VIII*

A 500-milliliter gas washing bottle was charged with 21.3 grams (0.15 mole) of 2-carbomethoxycyclopentanone, 0.1 gram sodium methoxide and 400 milliliters methanol. The reaction mixture was cooled to −30° C. and held at this temperature while about 0.18 mole of ozone was passed into the solution. The excess ozone was flushed out with nitrogen and 0.4 gram of 10 percent palladium on charcoal catalyst was added. A stream of hydrogen was bubbled through the solution for about one hour. The catalyst was filtered off and the solvent evaporated. The residue was taken up in hot benzene and cooled. On cooling, 4.80 grams of crystalline 5-carbomethoxy-5-oxovaleric acid separated. The solvent was distilled from the mother liquor and the residue distilled under reduced pressure. The fraction distilling 130–132° C. at 0.02 millimeter and crystallizing in the receiver was collected as product. This yielded an additional 3.70 grams of product bringing the total yield of 5-carbomethoxy-5-oxovaleric acid to 8.50 grams.

*Example IX*

A 500-milliliter gas washing bottle was charged with 34.2 grams (0.219 mole) of 2-carboethoxycyclopentanone, 400 milliliters t-butanol and about 200 milligrams of sodium methoxide. An ozone-oxygen mixture was bubbled through the solution until 0.207 mole had been absorbed. The excess ozone and oxygen was swept out with nitrogen and 0.2 gram of 10 percent palladium on charcoal was added. Hydrogen was bubbled through the reaction mixture a few minutes and a starch-iodide test taken and found to be negative. The catalyst was filtered off and the solvent evaporated. The oily residue was distilled at reduced pressure. The material distilled 100–152° at 0.35 millimeter. The fractions distilling 135–152° at 0.35 millimeter were taken as product. The yield of this partly crystalline product was 22.65 grams. The crystalline product was recrystallized from a ligroin-ether mixture to yield crystals, melting point 52–53° C. A mixed melting point with an authentic sample showed the compound to be 5-carbethoxy-5-oxovaleric acid.

The entire distillate from this ozonization was hydrolyzed with dilute hydrochloric acid to yield 2-oxoadipic acid. The first crop of crystals weighed 11.2 grams and melted 121–124°. A second crop obtained from the mother liquor weighed 3.2 grams and melted 118–122°. The total yield of 2-oxodapic acid was 14.4 grams, or 41 percent of the theoretical amount.

*Example X*

A 500-milliliter gas washing bottle was charged with 31.23 grams (0.2 mole) of 2-carbethoxycyclopentanone, 2.5 millimoles of lithium t-butoxide and 400 milliliters of t-butanol as solvent. An ozone-oxygen mixture was passed into the solution until 0.209 mole had been absorbed. An additional 2.5 millimoles of lithium t-butoxide was added after 0.178 mole of ozone had been absorbed to hasten the absorption of the ozone. The excess ozone was swept out with nitrogen and 0.4 gram of palladium on charcoal catalyst was added. Hydrogen was bubbled through the solution until the ozonide was reduced as evidenced by a negative starch iodide test. The catalyst was filtered off and the solvent distilled. The residue was taken up in ether and washed with 10 percent acetic acid. The product was recovered from the ether solution and distilled to yield 19.16 grams (0.108 mole) crystalline 5-carbethoxy-5-oxoadipic acid.

We claim:

1. A process for the preparation of 5-carbalkoxy-5-oxovaleric acids which comprises the step of reductively decomposing the reaction product of a lower alkyl ester of 2-oxocyclopentane carboxylic acid with ozone.

2. A process in accordance with claim 1 in which the reductive decomposition is effected by warming the ozone reaction product in the presence of at least substantially an equimolecular amount of formalin.

3. A process in accordance with claim 1 in which the reduction is effected by subjecting the ozone reaction product to the action of hydrogen with palladium on charcoal as the reduction catalyst.

4. A method of preparing a 5-carbalkoxy-5-oxovaleric acid which comprises the steps of reacting a lower alkyl ester of 2-oxocyclopentane carboxylic acid with ozone until reaction is substantially complete and reductively decomposing the resulting product.

5. A method of preparing 5-carbethoxy-5-oxovaleric acid which comprises the steps of subjecting 2-carbethoxycyclopentanone to the action of ozone until reaction is substantially complete and reductively decomposing the resulting product.

6. A method of preparing 5-carbomethoxy-5-oxovaleric acid which comprises the steps of subjecting 2-carbomethoxycyclopentanone to the action of ozone until reaction is substantially complete and reductively decomposing the resulting product.

7. A method of preparing 2-oxoadipic acid which comprises the steps of reductively decomposing the ozone reaction product of a lower alkyl ester of 2-oxocyclopentane carboxylic acid and thereafter hydrolyzing the resulting half-ester of 2-oxoadipic acid to remove the ester group.

8. A method of preparing the ozone reaction products of 2-carbalkoxycyclopentanones which comprises the step of subjecting a lower alkyl ester of 2-oxocyclopentane carboxylic acid to the action of ozone until reaction is substantially complete.

9. The ozone reaction products of the lower alkyl esters of 2-oxocyclopentane carboxylic acid.

10. The ozone reaction product of 2-carbethoxycyclopentanone.

11. The ozone reaction product of 2-carbomethoxycyclopentanone.

References Cited in the file of this patent

Stoll et al.: Helv. Chim. Acta 13, 142–153 (1930).